United States Patent [19]

Ernst

[11] 4,448,424

[45] May 15, 1984

[54] DOUBLE ANGLE SEAL FORMING LUBRICANT FILM

[75] Inventor: William D. Ernst, Troy, N.Y.

[73] Assignee: Mechanical Technology Incorporated, Latham, N.Y.

[21] Appl. No.: 444,490

[22] Filed: Nov. 24, 1982

[51] Int. Cl.³ .................. F16J 15/24; F16J 15/40; F16J 15/44

[52] U.S. Cl. .................. 277/30; 277/115; 277/121; 277/165; 277/171; 277/1; 277/190; 277/237 A; 277/DIG. 6

[58] Field of Search .................. 277/30, 31, 33, 115, 277/117–122, 165, 170, 171, 190, 191, 237, 1, DIG. 6

[56] References Cited

U.S. PATENT DOCUMENTS

| 648,675 | 5/1900 | Tripold | 277/115 |
| 3,214,179 | 10/1965 | Dega | 277/1 |
| 4,173,157 | 11/1979 | Miller et al. | 277/30 X |
| 4,190,259 | 2/1980 | Zitting | 277/165 |

FOREIGN PATENT DOCUMENTS

| 2314857 | 9/1974 | Fed. Rep. of Germany | 277/165 |
| 54-148955 | 11/1979 | Japan | 277/33 |
| 6705284 | 10/1968 | Netherlands | 277/237 |
| 1085205 | 9/1967 | United Kingdom | 277/237 |

Primary Examiner—Robert S. Ward
Attorney, Agent, or Firm—Joseph V. Claeys; Arthur N. Trausch, III

[57] ABSTRACT

A lubricated piston rod seal which inhibits gas leaking from a high pressure chamber on one side of the seal to a low pressure chamber on the other side of the seal. A liquid is supplied to the surface of the piston rod on the low pressure side of the seal. This liquid acts as lubricant for the seal and provides cooling for the rod. The seal, which can be a plastic, elastomer or other material with low elastic modulus, is designed to positively pump lubricant through the piston rod/seal interface in both directions when the piston rod is reciprocating. The capacity of the seal to pump lubricant from the low pressure side to the high pressure side is less than its capacity to pump lubricant from the high pressure side to the low pressure side which ensures that there is zero net flow of lubricant to the high pressure side of the seal. The film of lubricant between the seal and the rod minimizes any sliding contact and prevents the leakage of gas. Under static conditions gas leakage is prevented by direct contact between the seal and the rod.

15 Claims, 4 Drawing Figures

DOUBLE ANGLE SEAL FORMING LUBRICANT FILM

The Government of the United States of America has rights in this invention pursuant to Contract No. DEN3-32 awarded by U.S. Department of Energy.

TECHNICAL FIELD

This invention relates to a sealing means for preventing gas leakage between a lubricated rectilinearly-reciprocating member and a wall separating two gas chambers through which the member extends.

BACKGROUND OF THE INVENTION

Positive seals such as roll-sock seals and bellows have been used for piston rod applications but these are limited to short strokes and their short life is a major disadvantage.

The majority of piston rod seals can be classified as lubricated seals in which the interface between the seal and the piston rod is lubricated to reduce friction, wear and heat generation. The presence of the lubricant in the interface also reduces the leakage of gas from the high pressure chamber. The lubricant, usually oil, is applied directly to the surface of the piston rod on the low pressure side of the seal. While the lubricant plays an essential role in providing an effective gas seal in the majority of applications it is very undesirable to have any significant accumulation of lubricant in the high pressure gas chamber. A typical example is the main seals or piston rod seals in a reciprocating Stirling engine. The primary function of these seals is to minimize the leakage of gas (usually hydrogen) from the working cycles into the crankcase. An equally important requirement is that they prevent oil from the crankcase from entering the working gas region where it will contaminate the engine and deteriorate its performance.

To meet the requirements for negligible oil leakage the majority of lubricated seals incorporate a section which acts as a scraper. The scraper is intended to remove most of the lubricant from the piston rod and allow only a minimal quantity to enter the seal/piston rod interface. The effectiveness of the scraping action in removing lubricant is generally unpredictable and this can have a very strong influence on the life of the seal. If the scraper allows too little lubricant to pass into the seal/rod interface there will be an incomplete lubricant film. This will produce a less effective gas seal and there will be at least partial sliding contact between the rod and the seal. This contact will increase the friction and wear and accelerate the failure of the seal. If the scraper allows too much lubricant to pass into the rod/seal interface there is a strong possibility that the lubricant will contaminate the high pressure gas chamber unless the seal is designed to ensure that all the oil passes back through the rod/seal interface when the stroke is reversed.

One example of a lubricated seal is described in U.S. Pat. No. 4,251,081. The basic features of the seal are shown in FIG. 1. The seal 12 made of graphite reinforced polytetrafluoroethylene surrounds the piston rod 6. Oil is supplied to the surface of the piston rod through an annular groove 16 on the low pressure side of the seal. The seal is loaded against the surface of the piston rod by a compression spring system 13 and 14. The sharp, lower edge of the seal 18, acts as a scraper. On the high pressure side the seal is provided with a tubular extension 15 having a slightly increasing inner diameter in the direction towards the high pressure chamber. On the downstroke any oil present on the surface of the rod above the seal passes into the converging passage between the rod and the seal extension. The geometry of the passage combined with the motion of the rod produces a pumping effect and as a result the oil is returned to the low pressure side of the seal.

SUMMARY OF THE INVENTION

The object of this invention is to provide a reliable, efficient, long life, lubricated reciprocating seal which will inhibit gas leakage from a high pressure chamber on one side of the seal to a low pressure chamber on the other side of the seal.

A further object is to provide a lubricated piston rod seal in which a finite lubricant film prevents sliding contact between the rod and the seal and in which there is zero net flow of lubricant through the seal in either direction.

More particularly, the seal is made from a plastic, elastomer or other material with low elastic modulus. Under static conditions, leakage from the high pressure gas chamber is prevented by clamping the seal against the surface of the piston rod. This clamping action is provided by an initial interference fit of the seal on the rod and/or an externally applied radial force.

Under dynamic, reciprocating conditions the seal operates under established hydrodynamic principles. The seal geometry is such that the reciprocating motion of the rod generates a hydrodynamic film separating the rod and seal surfaces. The lubricant is applied to the surface of the rod on the low pressure side of the seal and the seal is designed so that the pumping of lubricant through the seal in each direction of the stroke are balanced thereby ensuring that there is zero net flow of oil to the pressure side of the seal. The presence of the lubricant film enhances the quality of the gas seal under dynamic conditions.

In some applications, for example a vacuum pump, it may be desirable to exclude lubricant from the low pressure chamber. In such cases, the lubricant could be applied to the surface of the rod on the high pressure side of the seal and the seal designed to have a greater pumping capacity when the rod is moving towards the high pressure chamber than it has when the motion is reversed.

While the present invention was conceived for a Stirling engine its use is not limited to this particular application which will be apparent from the detailed description of the seal. It should be understood that the detailed description and the specific examples, while indicating preferred embodiments of the invention are given by way of illustration only. Various changes and modifications within the spirit and scope of the invention will become apparent to those skilled in the art.

DETAILED DESCRIPTION OF THE INVENTION

Figure 1:
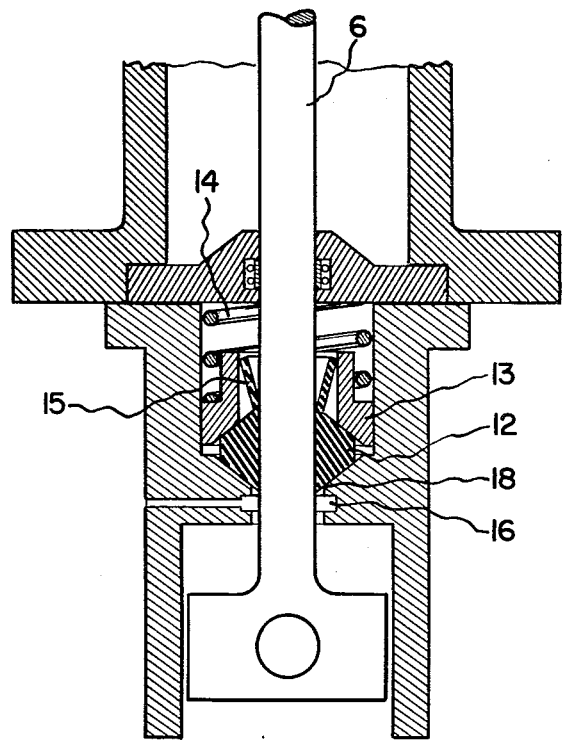
FIG. 1 is a schematic view of the prior art.
Figure 2:
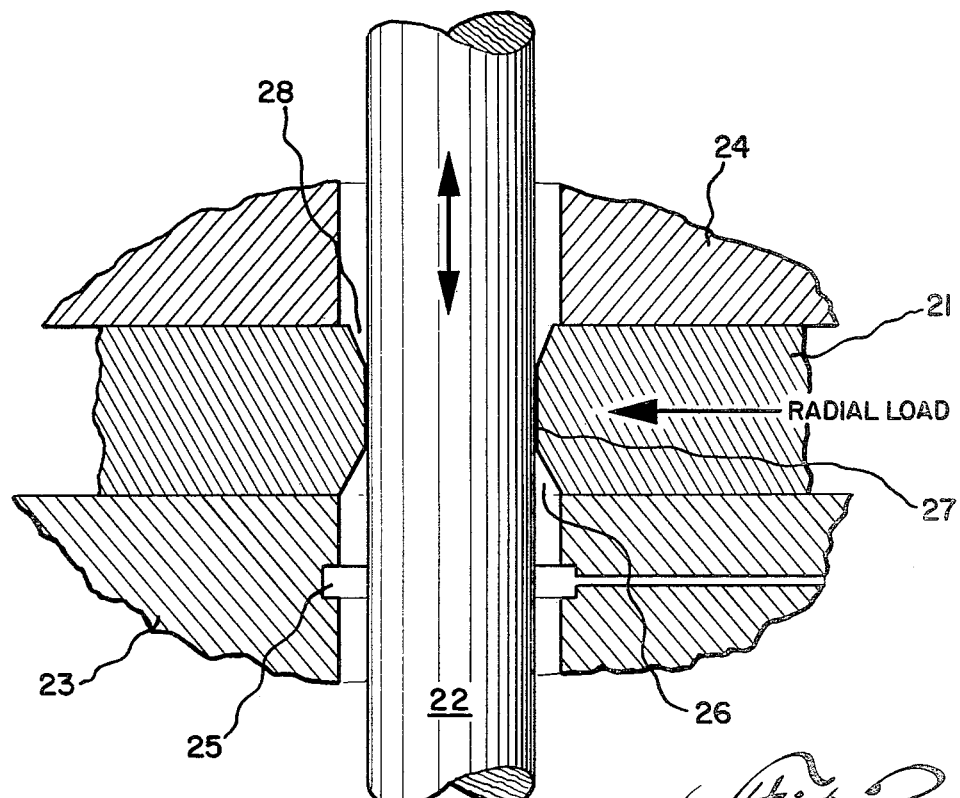
FIG. 2 shows a vertical section through a reciprocating member and seal according to the invention.

The general form of the seal is shown in FIG. 2. The seal gland 21 is made from a plastic, elastomer, soft metal or other material or composite of low elastic modulus such as, polytetrafluoroethylene filled with glass fibers, polytetrafluoroethylene filled with polyimide powder, or polytetrafluoroethylene filled with graphite fibers, silver, cadmium oxide and graphite powder. Seal gland 21 surrounds a reciprocating member, for example, rod 22. A retainer 24, holds the seal in contact with the wall 23 separating the high and low pressure chambers. The interface between the seal and the wall minimizes any leakage of gas by this route. The seal is loaded radially against the rod by an initial interference fit and/or an external loading system (not shown). Under static conditions the interference fit and/or external load provide intimate contact at 27 between the central section of the seal and the surface of the rod. Oil or any other liquid is supplied to the surface of the rod through an annular groove 25 or other means immediately below the seal. The liquid acts as a lubricant for the seal and provides cooling for the rod.

At each end of the seal gland there is an entry section 26 and 28 forming a convergent passage. These sections are shown with a conical form such that the clearance between the rod and the inner surface of the seal increases towards the extremities of the seal.

The entry sections play an important role in the operation of the seal under reciprocating motion. On the upstroke, lubricant is drawn into the convergent passage 26 where hydrodynamic pressures are generated. The pressures expand the seal gland to produce a clearance between the rod and the seal gland which is filled by a lubricant film. On the downstroke, lubricant on the surface of the rod is drawn into the convergent passage 28, hydrodynamic pressures are generated and expand the seal gland to allow the oil to pass through the seal. This dynamic operation is shown in FIG. 3.

The presence of a positive lubricant film separating the rod and seal surfaces on both the up and down strokes enhances the quality of the seal, reduces the leakage of gas and increases the life of the seal gland.

Figure 3:
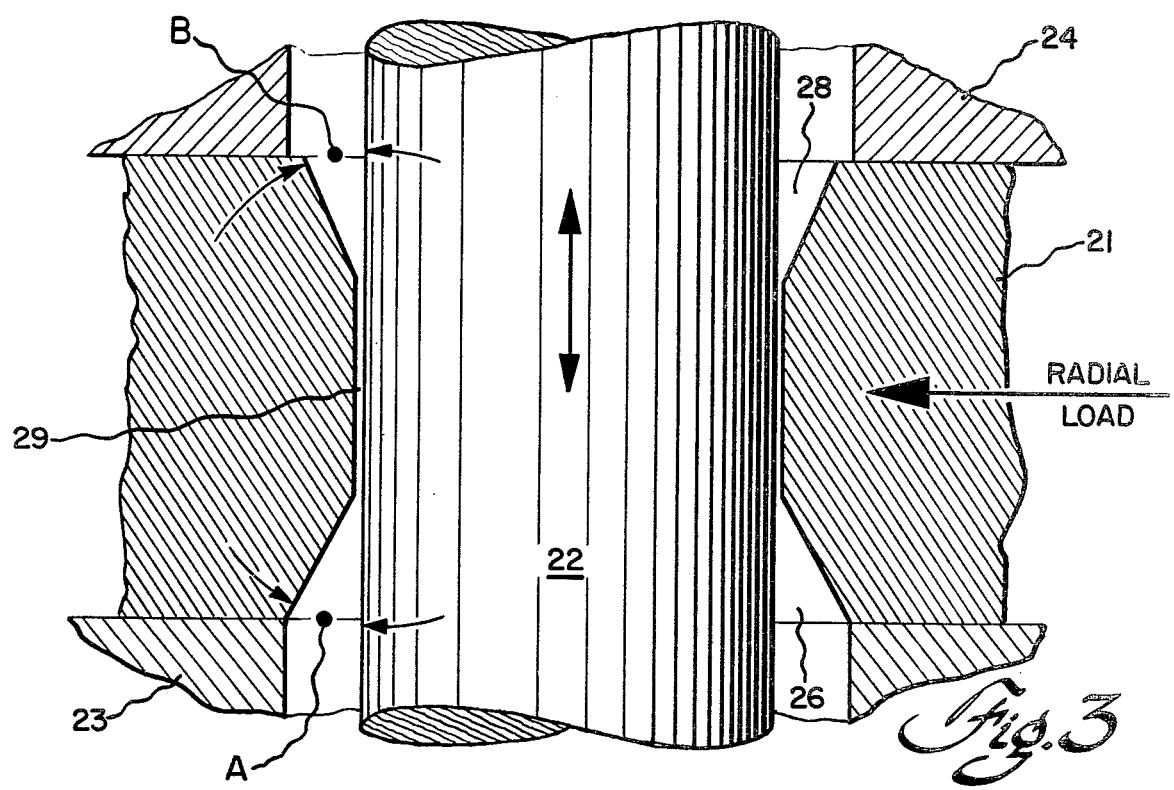
FIG. 3 shows details of the invention in dynamic operation.

In FIGS. 2 and 3, the inlet sections are shown to have a conical form but this is not essential for the operation of the seal; the entry sections may take any form which provides a convergent passage for the lubricant entering the seal on the up and down strokes. The general characteristic of each entry section is such that it has a decreasing geometry towards the confronting surfaces of the seal and the reciprocating member.

On the upstroke, the thickness of the lubricant film separating the rod and seal surfaces and the rate of pumping of lubricant through this clearance are functions of the convergent inlet geometry 26, the velocity of the rod, the lubricant viscosity, the dimensions and geometry of the seal, the elastic properties of the seal gland, the interference fit of the seal gland on the rod, the externally applied radial load, if any, and the pressure difference across the seal. Using established theories of elasto-hydrodynamic lubrication, the seal is designed to provide a small but finite lubricant film shown at 29 of FIG. 3 which ensures that there is no sliding contact between the rod and seal gland. On the downstroke the process is reversed but in this case the lubricant is supplied only by the film of lubricant on the rod surface which was pumped through the seal on the upstroke. To ensure that there is no net flow of lubricant towards the high pressure side of the seal the overall design of the seal must be such that its pumping capacity (i.e. the volume of lubricant which can pass thru the seal) on the downstroke is greater than or equal to its pumping capacity on the upstroke. This can be readily achieved by the appropriate design of the entry sections 26 and 28. With conically shaped entry sections as shown in FIG. 3 this is basically dependent on the angles A and B. The smaller angle B will normally have a greater pumping capacity than the larger angle A. (The change in lubricant density due to absorption may have to be considered).

The selection of specific values for angles A and B must be made as part of the overall seal design for a particular application but in general these angles will be small and in practice would not exceed 45°. The preferred range would be between 0° to 15°.

Figure 4:
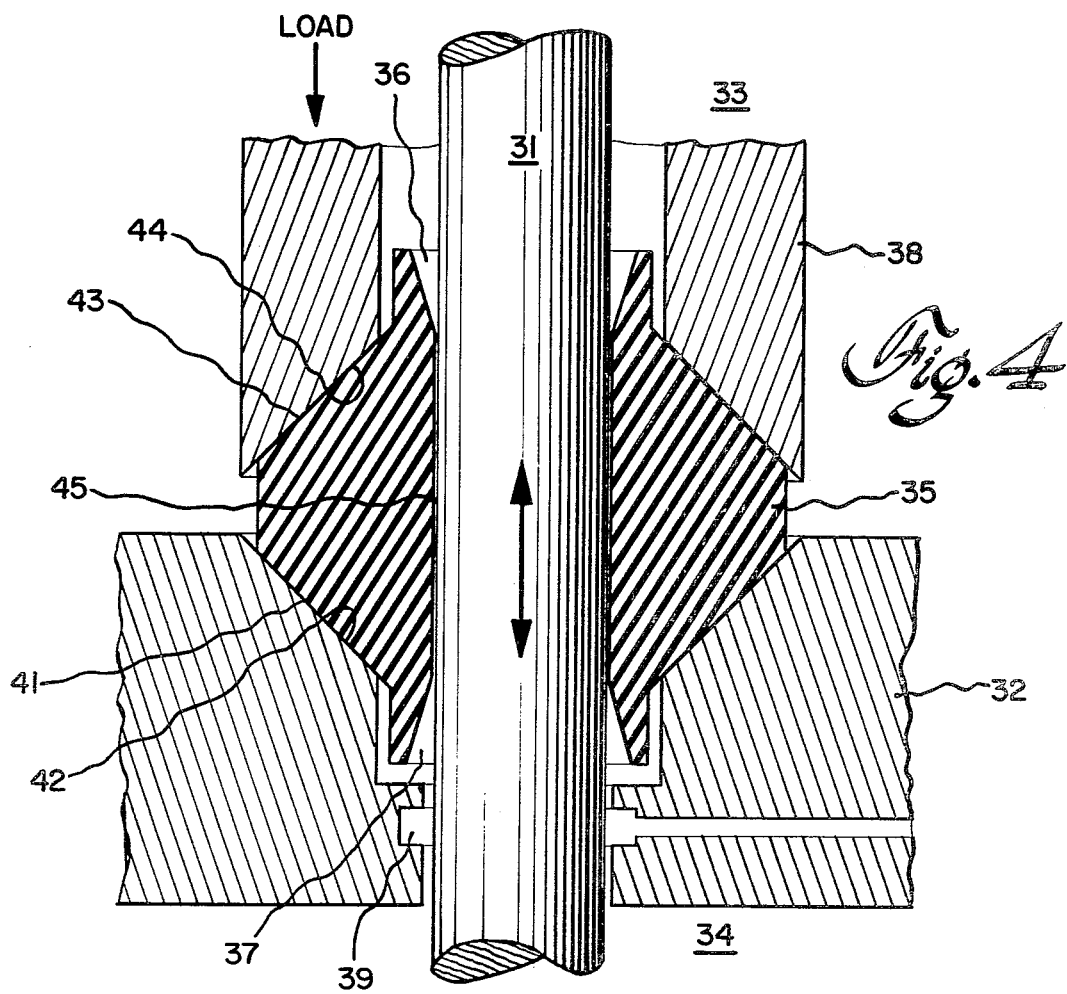
FIG. 4 shows a vertical section through a piston rod and seal and is a preferred embodiment.

A specific example of a seal which embodies the general principles heretofore described is shown in FIG. 4. The reciprocating piston rod 31, as for example in a Stirling engine, passes through the wall 32 which separates a high pressure gas chamber 33 from a low pressure gas chamber 34. The seal gland 35, which may be a plastic, elastomer or other material with a low elastic modulus, surrounds the piston rod. The cross-section of the seal gland has a basic trapezoidal form with tubular extensions above and below the main body of the seal. The inner surfaces of these tubular extensions are shaped to form convergent entry sections 36 and 37. The outer, lower conical surface 41 of the seal gland fits into a matching conical seat 42 in the wall 32. The outer, upper conical surface 43 of the seal gland is in contact with a cylindrical loading piece 38 which has a matching conical surface 44. Contact between the loading piece and the seal gland and between the seal gland and the wall is maintained by an axial force applied to the loading piece by a compression spring or other means (not shown). Through the outer conical surfaces of the seal gland, the axial force also exerts a radial force component on the seal which loads it radially against the piston rod. Additional, a radial load may be provided by an interference fit of the seal gland on the piston rod. The lubricant is supplied to the surface of the piston rod through an annular groove 39 or other means on, for example, the low pressure side of the seal. On the upstroke, lubricant is hydrodynamically pumped upward from convergent entry section 37, expanding the seal gland to produce a clearance between the rod and the seal gland at 45 which is filled by a lubricant film. On the downstroke, lubricant on the surface of the rod is drawn into the convergent entry section 36 and hydrodynamically pumped downward, expanding the seal gland to allow the oil to pass. By appropriate design of the convergent entry sections 36 and 37, for example by having the angle of cone 37 greater than or equal to the angle of cone 36, there is no net flow of lubricant towards the high pressure side. Yet there is a continuous film of lubricant being pumped both ways so as to totally lubricate the rod/seal gland interface.

While the above description has been limited to the configuration where lubricant is supplied to the piston rod in the low pressure gas chamber and there is no net flow of lubricant into the high pressure chamber, this is not exclusive. For an application which permits a lubricant to be present in high pressure chamber but not in the low pressure chamber, a seal can be designed to operate on the principles described above with the lubricant applied to the surface of the rod on the high pressure side of the seal and a greater pumping capacity from the low to the high pressure side.

From the description of the invention it will be obvious that the same may be varied in many ways. Such variations are not to be regarded as a departure from the spirit and scope of the invention and all such modifications as would be obvious to one skilled in the art are intended to be included within the scope of the following claims.

I claim:

1. A seal assembly for preventing gas leakage along a reciprocating member between a first gas chamber and a second gas chamber, including a wall through which said member extends and separating said first chamber and said second chamber; means for supplying a lubricant to the surface of said reciprocating member in at least one of said first and second gas chambers; a sealing gland having a first and second end and held against the wall between the first chamber and the second chamber; the improvement comprising:

means for mounting said sealing gland to said reciprocating member to provide for a predetermined radial load;

means at said first end of said sealing gland proximate the lubricant supply forming a first convergent passage between said gland and said reciprocating member operative to effect lubricant pumping in the direction into said sealing gland and sufficient to overcome said radial load and establish a finite lubricant film between the confronting surfaces of the reciprocating member and the sealing gland;

means at said second opposite end of said sealing gland forming a second convergent passage between said gland and said reciprocating member to effect lubricant pumping in the direction into said sealing gland sufficient to at least balance the flow of lubricant being pumped from said first end of said sealing gland.

2. The lubricated seal assembly as claimed in claim 1, wherein each of said end sections of said sealing gland has the form of a frustum of a right cone which, in conjunction with said reciprocating member forms said first and second convergent passages.

3. The lubricated sealing assembly as claimed in claim 2, wherein said sealing gland is elastomer material.

4. The lubricated sealing assembly as claimed in claim 3, wherein said reciprocating member is a piston rod.

5. The lubricated sealing assembly as claimed in claim 1, wherein said first chamber is a low pressure chamber and said second chamber is a high pressure chamber.

6. The lubricated sealing assembly as claimed in claim 1, wherein said first chamber is a high pressure chamber and said second chamber is a low pressure chamber.

7. The lubricated seal assembly as claimed in claim 1, wherein said means for mounting said sealing gland to provide a predetermined radial load includes a positive interference fit at static conditions.

8. The lubricated seal assembly as claimed in claim 7, wherein said first and second end sections of said sealing gland have the form of a frustum of a right cone which, in conjunction with said reciprocating member form said first and second convergent passages.

9. The lubricated sealing assembly as claimed in claim 8, wherein each frustum of right cone between the gland and reciprocating member is defined by an angle in the range between 0° to 45°.

10. The lubricated sealing assembly as claimed in claim 9, wherein the angle of the frustum of said first end section is larger than the angle of the frustum of said second end section.

11. A piston rod seal assembly in a Stirling engine for preventing gas leakage along a piston rod between a first low pressure gas chamber and a second high pressure gas chamber, including a wall through which said piston rod extends and separating said first chamber and said second chamber; means for supplying a lubricant to the surface of said piston rod in said first gas chamber; an elastomer sealing gland having a first and second end and held against the wall between the first chamber and the second chamber; the improvement comprising:

means for biasing said sealing gland to said piston rod to provide for a predetermined radial loading;

a first convergent passage on said first end of said sealing gland proximate the lubricant supply having the form of a frustum of a right cone on said gland and opposite said piston rod, operative to effect hydrodynamic lubricant pumping in the direction into said sealing gland and sufficient to overcome the radial loading and establish a finite lubricant film between the confronting surfaces of the piston rod and the sealing gland; and a second convergent passage on said second end of said sealing gland having the form of a frustum of a right cone on said sealing gland and opposite said piston rod, operative to effect hydrodynamic lubricant pumping in the direction into said sealing gland sufficient to balance the flow of lubricant being pumped from the first end of said sealing gland.

12. The lubricated seal assembly as claimed in claim 11, wherein said means for biasing said sealing gland to provide a predetermined radial load includes a positive interference fit at static conditions.

13. The lubricated seal assembly as claimed in claim 11, wherein said means for biasing said sealing gland to provide a predetermined radial load further comprises a compression spring axially loading a loading member such that a radial force component loads the sealing gland against the piston rod.

14. The lubricated seal assembly as claimed in claim 11, wherein each frustum of a right cone between the gland and piston rod is defined by an angle in the range between 0° to 45°.

15. The lubricated seal assembly as claimed in claim 14, wherein the angle of the frustum of said first convergent passage is at least equal or greater than the angle of the frustum of said second convergent passage.

* * * * *